United States Patent
Gras et al.

(10) Patent No.: US 12,467,995 B2
(45) Date of Patent: Nov. 11, 2025

(54) METHOD FOR GENERATING MULTI-RAY SPIN-EXCITATION SEQUENCES AND APPLICATION THEREOF TO MAGNETIC RESONANCE IMAGING

(71) Applicant: COMMISSARIAT A L'ENERGIE ATOMIQUE ET AUX ENERGIES ALTERNATIVES, Paris (FR)

(72) Inventors: Vincent Gras, Gif sur Yvette (FR); Franck Mauconduit, Gif sur Yvette (FR); Nicolas Boulant, Gif sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 170 days.

(21) Appl. No.: 18/277,735

(22) PCT Filed: Mar. 11, 2022

(86) PCT No.: PCT/EP2022/056381
§ 371 (c)(1),
(2) Date: Aug. 17, 2023

(87) PCT Pub. No.: WO2022/194711
PCT Pub. Date: Sep. 22, 2022

(65) Prior Publication Data
US 2024/0183918 A1    Jun. 6, 2024

(30) Foreign Application Priority Data
Mar. 17, 2021  (FR) ........................... 2102654

(51) Int. Cl.
*G01V 3/00* (2006.01)
*G01R 33/48* (2006.01)
(Continued)

(52) U.S. Cl.
CPC ...... *G01R 33/4835* (2013.01); *G01R 33/4826* (2013.01); *G01R 33/5612* (2013.01); *G01R 33/5659* (2013.01)

(58) Field of Classification Search
CPC ............ G01R 33/287; G01R 33/4835; G01R 33/5608; A61B 2090/374
(Continued)

(56) References Cited

U.S. PATENT DOCUMENTS

2017/0082714 A1* 3/2017 Massire ............. G01R 33/4836

FOREIGN PATENT DOCUMENTS

EP    3 153 874 A1    4/2017
EP    3 594 710 A1    1/2020

OTHER PUBLICATIONS

Conolly, et al., "Variable-rate selective excitation", Journal of Magnetic Resonance, vol. 78, No. 3, pp. 440-458, 1988.
(Continued)

*Primary Examiner* — Walter L Lindsay, Jr.
*Assistant Examiner* — Frederick Wenderoth
(74) *Attorney, Agent, or Firm* — BakerHostetler (57) ABSTRACT

A method for determining a global and regular parameterization for a family of spin-excitation pulse sequences in magnetic resonance imaging, with each pulse sequence of the family being a multi-spoke type sequence suitable for selectively exciting nuclear spins in a slice of a volume of interest of a body immersed in a static magnetic field and comprising radiofrequency pulses at a Larmor frequency of the nuclear spins alternated with magnetic gradient pulses. The global parameterization minimizes a function representing a mean deviation from a setpoint of the excitation of the nuclear spins, with the mean being computed for the volume of interest and for all the possible orientations and positions of the slices. It allows a selective excitation sequence to be
(Continued)

simply designed for a slice with a random orientation and position.

19 Claims, 6 Drawing Sheets

(51) Int. Cl.
*G01R 33/483* (2006.01)
*G01R 33/561* (2006.01)
*G01R 33/565* (2006.01)

(58) Field of Classification Search
USPC .......................................................... 324/309
See application file for complete search history.

(56) References Cited

OTHER PUBLICATIONS

Shinnar, "Reduced power selective excitation radiofrequency pulses", Magnetic resonance in medicine, vol. 32, No. 5, Art. No. 5, pp. 658-660, 1994.
Setsompop, et al. "Slice-selective RF pulses for in vivo B1+ inhomogeneity mitigation at 7 Tesla using parallel RF excitation with a 16-element coil", Magnetic Resonance in Medicine, vol. 60, No. 6, pp. 1422-1432, 2008.
Moeller et al., "Multiband multislice GE-EPI at 7 Tesla, with 16-fold acceleration using partial parallel imaging with application to high spatial and temporal whole-brain fMRI", Magnetic Resonance in Medicine, vol. 63, No. 5, Art. No. 5, pp. 1144-1153, May 2009.
Amadon, et al., "Validation of a very fast B1-mapping sequence for parallel transmission on a human brain at 7T", Proceedings of the 20th Annual Meeting of ISMRM, pp. 3358, 2012.
Poser, et al., "Simultaneous multislice excitation by parallel transmission", Magnetic Resonance in Medicine, vol. 71, No. 4, pp. 1416-1427, 2014.
Guérin, et al., "Design of parallel transmission pulses for simultaneous multislice with explicit control for peak power and local specific absorption rate", Magnetic Resonance in Medicine, vol. 73, No. 5, pp. 1946-1953, 2015.
Sharma, et al., "Low peak power multiband spokes pulses for B1+ inhomogeneity-compensated simultaneous multislice excitation in high field MRI", Magnetic Resonance in Medicine, vol. 74, No. 3, Art. No. 3, pp. 747-755, Sep. 2015.
Gras, et al., "In Vivo Demonstration of Whole-Brain Multislice Multispoke Parallel Transmit Radiofrequency Pulse Design in the Small and Large Flip Angle Regimes at 7 Tesla", Magnetic Resonance in Medicine, vol. 78, No. 3, pp. 1009-1019, 2017.
Gras, et al., "New method to characterize and correct with sub-µs precision gradient delays in bipolar multispoke RF pulses", Magn. Reson. Med, vol. 78, pp. 2194-2202, Jan. 2017.
Cao et al., "Joint design of large-tip-angle parallel RF pulses and blipped gradient trajectories", Magnetic Resonance In Medicine, vol. 75, No. 3, pp. 1198-1208, Apr. 27, 2016.
Tse, et al., "High-resolution gradient-recalled echo imaging at 9.4T using 16-channel parallel transmit simultaneous multislice spokes excitations with slice-by-slice flip angle homogenization", Magn Reson Med, vol. 78, No. 3, pp. 1050-1058, 2017.

* cited by examiner

METHOD FOR GENERATING MULTI-RAY SPIN-EXCITATION SEQUENCES AND APPLICATION THEREOF TO MAGNETIC RESONANCE IMAGING

CROSS-REFERENCE TO RELATED APPLICATIONS

This application is a National Stage of International patent application PCT/EP2022/056381, filed on Mar. 11, 2022, which claims priority to foreign French patent application No. FR 2102654, filed on Mar. 17, 2021, the disclosures of which are incorporated by reference in their entireties.

FIELD OF THE INVENTION

The invention relates to the field of magnetic resonance imaging (MRI) and more specifically relates to the phase of exciting nuclear spins. Even more specifically, it relates to the design and application of selective "multi-spoke" (or "Fast-kz") sequences of nuclear spin-excitation pulses ("excitation sequences"). It is notably applicable to high magnetic field MRI (several Teslas, for example, 3 Teslas (T) or more, or even 5 Teslas or more, or even 7 Teslas or more).

BACKGROUND

In MRI, the spin-excitation profile is subordinate to the distribution of the spin-excitation radiofrequency field in the part of the body to be imaged. With a low magnetic field (B0<1T), with the magnetic resonance frequency (Larmor frequency) of the spin of the proton being weak, a highly uniform and relatively independent distribution of the object to be imaged can be acquired with a suitably designed transmission RF antenna. With a higher magnetic field, the wavelength of radiation at the Larmor frequency becomes comparable to the characteristic dimensions of the body to be imaged; this results in interference effects that cause significant inhomogeneities. This is confirmed at around 7 T for brain imaging and from 3 T for that of the abdomen. Under these conditions, it is no longer possible to ensure homogeneous excitation by means of a suitable design of the transmission antenna and recourse to alternative techniques is required.

A first technique involves replacing the transmission RF volumetric antenna with an array of antennae, each element of which can be excited by a signal that is specific thereto, independently of the other elements of the array. This is referred to as parallel transmission or "RF-shimming".

A second technique, called optimal control, directly affects the dynamics of the spins (Bloch equation) and aims to expose the $B_1^+$ field spins (emitted radiofrequency field) and has magnetic field gradients that vary over time so as to create a flip angle of the nuclear spins in a region of interest in accordance with a setpoint, to the nearest error to be minimized.

In MRI it is possible to restrict the extent of the excitation of the spins to a slice, the position, thickness and orientation of which can be arbitrarily selected by virtue of the simultaneous application of a properly selected magnetic field gradient and of radiofrequency pulses. This is called selective excitation herein. This technique allows, but this is not the only advantage, the space to be divided into slices and thus reduces the problem of the homogenization of the excitation to that of the homogenization of the excitation of the spins inside each slice, independently of what occurs in the other slices.

These homogenization techniques can be used separately or in combination. This results in the use of a global multi-slice sequence made up of several selective excitation sequences, each optimized for exciting a slice of the volume of interest as homogeneously as possible. These sequences may or may not use parallel transmission. See [Cao 2015], for example.

The spatial definition of the one or more slices to be imaged, i.e., the position and the incline of the slice, can result in specific optimization of the properties of the RF signals and of the static magnetic field gradient signals. With N denoting the number of considered slices, implementing the global multi-slice sequence therefore requires the definition of N independent sets of signals (1 complex signal per transmission channel on the RF transmission antenna array and 3 real signals for the 3 magnetic field gradient axes). This approach effectively allows the spin-excitation homogeneity in each slice to be optimized, but nevertheless has certain disadvantages compared to non-optimized multi-slice acquisition (same RF and magnetic gradient signals for all the slices).

Firstly, acquiring these N sets of signals can result in sizable computations in terms of computational resources. This can hinder the quality of the examination, or quite randomly limit the possibilities offered by MRI.

Moreover, with these N sets of signals being acquired independently, the joint analysis of the N images can, under these conditions, reveal discontinuities in contrast (by amplitude and by phase) between slices. This behavior is not desirable because it makes it difficult or even impossible to recombine these N images into a volumetric image for image reading in planes that are not aligned with the cutting plane.

SUMMARY OF THE INVENTION

The invention aims to provide a solution to these two problems.

According to the invention, this aim is achieved by defining a regular (i.e., continuous) parameterization of the RF and gradient signals as a function of the incline and position parameters of the slice. Since this parameterization is computed, it is possible to implement any multi-slice protocol by simply assessing the parameterization based on the N slice inclines/positions defined by the protocol, which requires an extremely simple and almost instantaneous computation. A "meta-pulse" or "global parameterization" concept can be referred to in the sense that the parameterization covers a whole family of selective excitations optimized to create a uniform flip angle. This meta-pulse is converted into a pulse in its own right as soon as the slice properties (position and incline) are provided. The proposed approach is completely compatible with the two techniques for homogenizing excitation, namely parallel transmission and optimal control. It is also compatible with the "universal pulses" as disclosed by EP 15306569 or with the method for designing and adjusting universal radiofrequency pulses in MRI by parallel transmission disclosed by EP 3594710.

The invention is based on the technique of multi-spoke (or "Fast-kz") pulses, notably known from [Setsompop 2008], which involves constructing sequences of selective excitations made up of RF pulses separated by the application of magnetic gradient pulses that allow the contributions of the various RF pulses to interfere. By optimizing the times (area under the curve) of the magnetic gradient pulses, it is possible to thus create composite pulses yielding good excitation homogeneity. Typically, this approach is used in conjunction with "RF shimming": each RF pulse is actually made up of several independent sub-pulses emitted by separate emission (or transmission, the two terms will be equally used) channels. The use of a single emission channel is nevertheless possible, but this requires the use of much longer pulse sequences.

It should be noted that techniques for the global design of multi-slice sequences have been proposed in the past, see, for example [Poser 2014], [Guérin 2015], [Gras 2017]. However, these techniques aim to solve a much different problem, namely minimizing the specific absorption rate, and do not allow the discontinuities in contrast between slices to be addressed.

An aim of the invention is a method for determining a global parameterization for a family of spin-excitation pulse sequences in magnetic resonance imaging, with each pulse sequence of said family being a multi-spoke type sequence suitable for selectively exciting nuclear spins in a respective slice of a volume of interest of a body immersed in a static magnetic field and comprising the same predetermined number of radiofrequency pulses at a Larmor frequency of said nuclear spins alternated with magnetic gradient pulses, the method comprising the steps of:
  A) acquiring at least one intensity map of radiofrequency radiation at the Larmor frequency in said volume of interest;
  B) defining a first set of parameters characterizing the radiofrequency pulses and a second set of parameters characterizing the magnetic gradient pulses, with the value of each parameter of each of said sets being expressed by a truncated series of functions of a position coordinate and of a pair of angular orientation coordinates of one of said slices, with each series being determined by its coefficients;
  C) computing, from said one or more intensity maps, the values of the coefficients of said truncated series of functions that minimize a function representing a mean deviation from a predetermined setpoint (for example, provided by a user) of the excitation of the nuclear spins, with the mean deviation being computed for said volume of interest and for all the possible orientations and positions of said slices; with said values forming said global parameterization.

Another aim of the invention is a method for designing a multi-spoke spin-excitation pulse sequence in magnetic resonance imaging, with said pulse sequence being suitable for selectively exciting nuclear spins in a respective slice of a volume of interest inside a body immersed in a static magnetic field and comprising the same predetermined number of radiofrequency pulses at a Larmor frequency of said nuclear spins alternated with magnetic gradient pulses, with the slice being identified by values of a position coordinate and of a pair of angular orientation coordinates, the method being characterized in that it comprises the steps of:
  a) providing a global parameterization for a family of such excitation sequences, with said global parameterization being made up of a first and a second plurality of sets of coefficients of respective truncated series of functions of said position and orientation coordinates of one of said slices, with each set of the first plurality of sets being made up of the coefficients of a truncated series of functions defining a parameter of a radiofrequency pulse and each set of the second plurality of sets being made up of the coefficients of a truncated series of functions defining a parameter of a magnetic gradient pulse; and
  b) computing the values of said gradient pulse and radiofrequency pulse parameters from said global parameterization, said truncated series of functions and the values of said position coordinate of said pair of angular orientation coordinates of the slice.

The global parameterization notably can be acquired using a method as outlined above.

A still further aim of the invention is a magnetic resonance imaging method comprising the following steps of:
  i) designing a plurality of multi-spoke spin-excitation pulse sequences, with each of said pulse sequences being suitable for selectively exciting nuclear spins in a respective slice of a volume of interest of a body to be imaged that is immersed in a static magnetic field and comprising radiofrequency pulses at a Larmor frequency of said nuclear spins alternated with magnetic gradient pulses, with each slice being identified by respective values of a position coordinate and of a pair of angular orientation coordinates;
  ii) applying said spin-excitation pulse sequences to said body in succession, with a magnetic gradient for slice selection being applied at the same time as each radiofrequency pulse;
  iii) acquiring, after each of said spin-excitation pulse sequences, a magnetic resonance signal emitted by the nuclear spins; and
  iv) processing the signals thus acquired in order to reconstruct an image of a portion of said reference volume defined through the union of said slices; characterized in that step i) is implemented using a method for designing a sequence of spin-excitation pulses as mentioned above.

A still further aim of the invention is a computer programmed for:
  α) receiving as input at least one intensity map of radiofrequency radiation in a volume of interest of a body immersed in a static magnetic field, with said radiofrequency radiation being at a Larmor frequency of nuclear spins of said body;
  β) defining a global parameterization for a family of multi-spoke spin-excitation pulse sequences in magnetic resonance imaging, with each pulse sequence of said family being suitable for selectively exciting nuclear spins in a slice of said volume of interest and comprising radiofrequency pulses at a Larmor frequency of said nuclear spins alternated with magnetic gradient pulses, with said global parameterization comprising a first set of parameters characterizing said radiofrequency pulses and a second set of parameters characterizing said magnetic gradient pulses, with the value of each parameter of each of said sets being expressed by a truncated series of functions of a position coordinate and of a pair of angular orientation coordinates of one of said slices, with each series being determined by its coefficients;
  γ) computing, from said one or more intensity maps, the values of the coefficients of said truncated series of functions that minimize a function representing a mean deviation from a setpoint of the excitation of the nuclear spins, with the mean being computed for said volume of interest and for all the possible orientations and positions of said slices.

A still further aim of the invention is a computer programmed for implementing a method for designing a sequence of spin-excitation pulses as outlined above.

A further aim of the invention is a magnetic resonance imaging appliance equipped with such a computer.

BRIEF DESCRIPTION OF THE DRAWINGS

Further features, details and advantages of the invention will become apparent from reading the description, which is provided with reference to the accompanying drawings, which are provided by way of an example and which represent, respectively.

DETAILED DESCRIPTION

Figure 1:
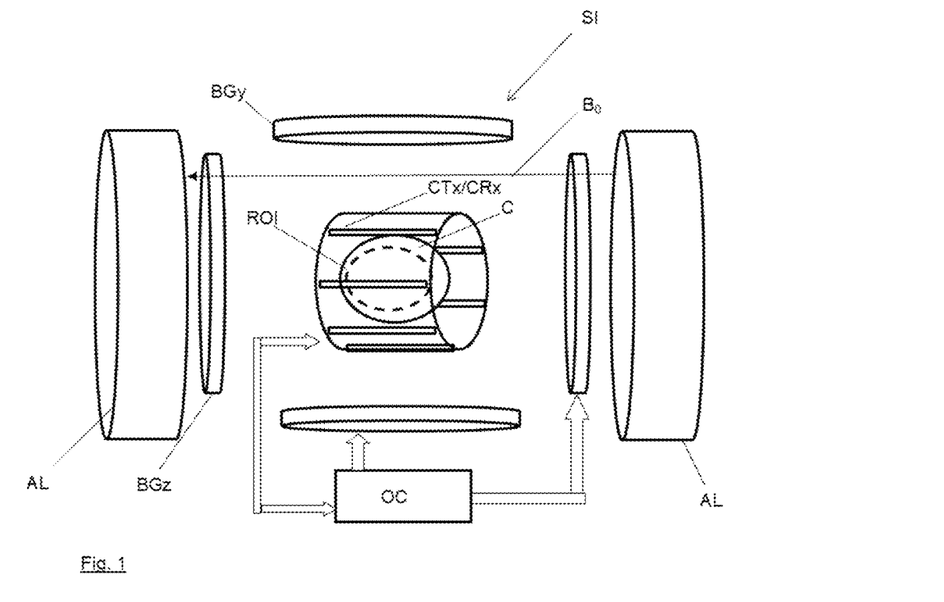
FIG. 1 an appliance, or MRI "scanner", suitable for implementing the invention.

FIG. 1 highly schematically illustrates an MRI appliance SI (or "scanner") suitable for implementing the invention. This appliance comprises;

- a magnet AL for generating a magnetizing static magnetic field $B_0$, called longitudinal magnetic field, oriented in a direction "z";
- coils BGx (not shown), BGy and BGz for generating magnetic field gradients in the mutually orthogonal directions "x", "y", and "z";
- a plurality of radiofrequency emission and reception antennas CTx/CRx surrounding a region or volume of interest ROI that can contain a body C to be imaged (the term "body" is understood to mean any material object, which may or may not be biological, that can be imaged by MRI; it typically will be a human body or part of a human body, for example, a head); in particular, the region of interest contains the isocenter IC (reference shown in [FIG. 2]), which is the only point where the magnetic field remains constant irrespective of the gradient applied by the coils BGx, BGy, BGz; and
- a control computer OC that controls the gradient coils BGx, BGy and BGz and the RF antennas CTx/CRx.

By means of electronic circuits (not shown), the computer OC controls the gradient coils BGx, BGy and BGz so that they generate gradient pulses and controls the RF antennas CTx/CRx so that they generate radiofrequency pulses so as to apply an excitation sequence to the body C that is acquired using the method of the invention. Furthermore, the computer OC receives magnetic resonance signals from the antennas CTx/CRx, which signals are emitted by the nuclear spins of the object following their excitation, and processes these signals in order to conventionally reconstruct an MRI image of the body C.

Appropriate excitation sequences also allow the computer OC to acquire maps of the spatial distribution of the RF $B_1^+$ field emitted by each antenna. These maps are required for implementing the invention, as will be explained in detail hereafter. The document by [Amadon 2012] describes a method for acquiring $B_1^+$ maps.

The appliance of FIG. 1 comprises a plurality of RF antennas allowing parallel transmission techniques to be used, but the use of a single antenna is also possible, although less advantageous. Furthermore, the emitting and receiving antennas can be separate.

Figure 2:
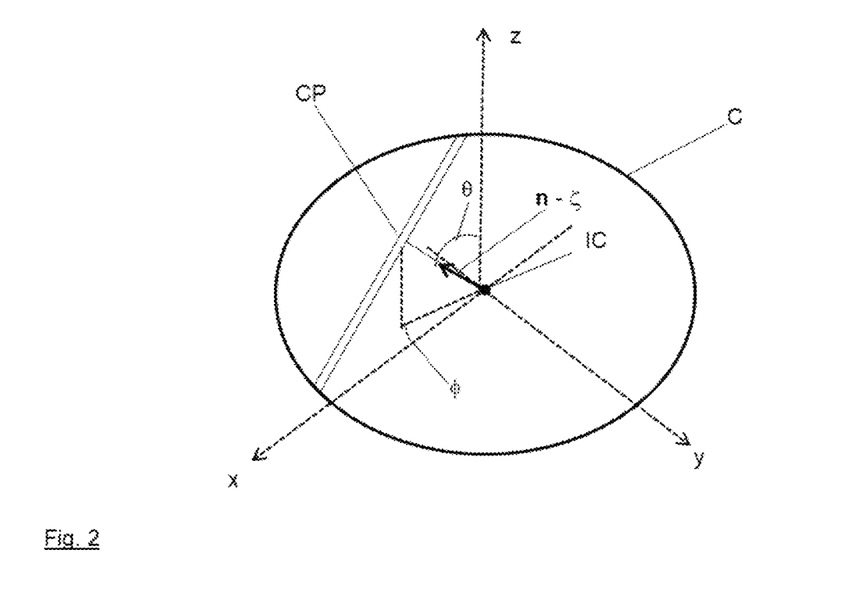
FIG. 2 the coordinates for identifying a slice of a body to be imaged.

FIG. 2 allows the coordinates to be defined that identify a slice CP of the body C.

Let n be the unit vector perpendicular to the slice. The orientation of this vector is defined by the spherical $\theta$ (azimuth or longitude) and $\phi$ (colatitude) angular coordinates originating from the isocenter IC. Let r be the position vector of any point of the slice relative to the isocenter; the scalar product n·r yields $\zeta$, which is the distance from the slice to the origin. The scalar product $\zeta$ can be considered to be a position coordinate of the slice.

Figure 3:
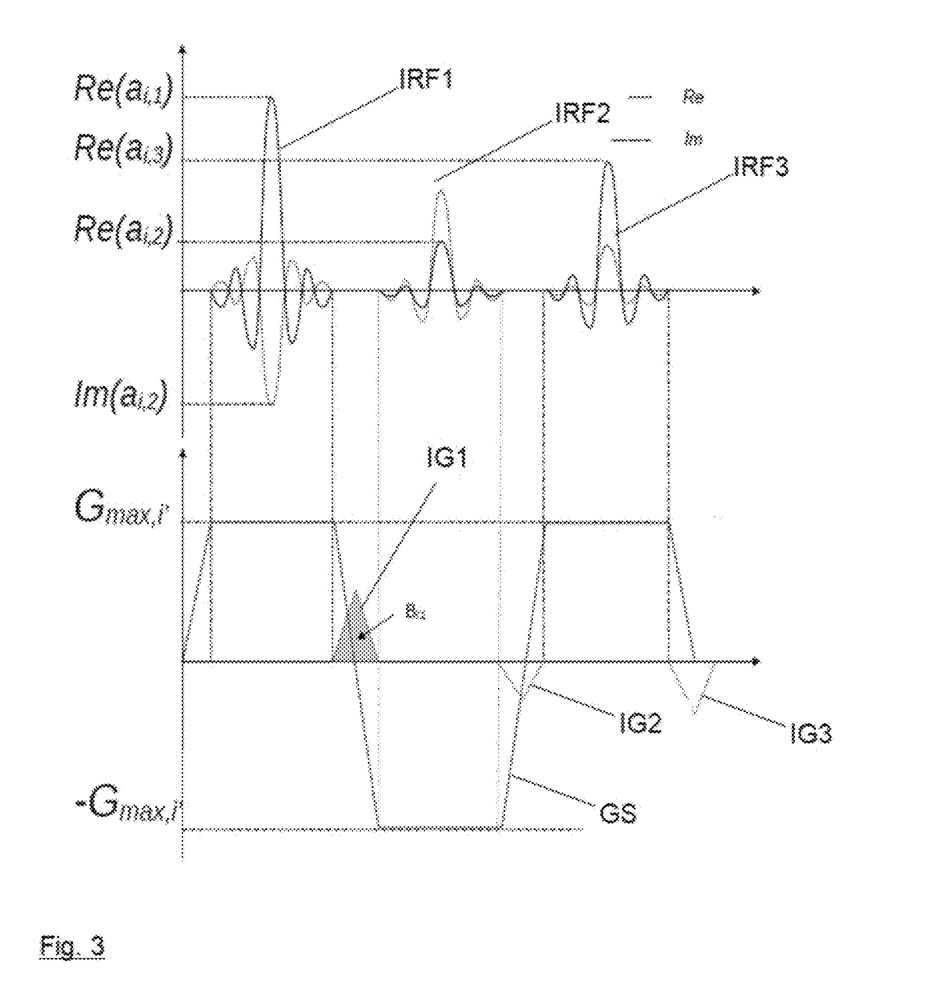
FIG. 3 a portion of an excitation sequence according to one embodiment of the invention.

FIG. 3 is a diagram of a simple excitation sequence according to one embodiment of the invention, comprising three radiofrequency pulses IRF1, IRF2 and IRF3 and three gradient pulses IG1, IG2 and IG3 alternating with the radiofrequency pulses. Slice selection gradients GS are applied at the same time as the radiofrequency pulses.

For the sake of simplicity, FIG. 3 only shows the radiofrequency pulses associated with a single emission channel, identified by an index "i".

The radiofrequency pulses IRF1, IRF2 and IRF3 have the same temporal shape (a cardinal sine) and have different complex amplitudes $a_{i,1}$, $a_{i,2}$, $a_{i,3}$. The real and imaginary parts of the pulses, amplitude $Re(a_{i,j})$ and $Im(a_{i,j})$, $j \in \{1, 2, 3\}$, are shown as solid and dashed lines, respectively. In order to excite a slice that is offset relative to the isocenter ($\zeta \neq 0$), the waveforms of the radiofrequency pulses are multiplied by a carrier $\exp(i\Delta f\, t)$, with $\Delta f = \gamma \cdot GS_{tot} \cdot \zeta$, $GS_{tot}$ being the result of the selection gradients applied by the various coils, $\gamma$ being the gyromagnetic ratio of nuclei and i being the imaginary unit.

The selection gradients GS are applied at the same time as the radiofrequency pulses. Only one component, identified by an index $i' \in \{x, y, z\}$, and with a maximum amplitude $G_{max,i'}$, is shown. The amplitude of the resultant of the three components determines the thickness of the slice. It should be noted that the gradient pulses have alternating polarity; in a manner per se known, this allows gradient pulses for "rewinding" the phase to be dispensed with that would be necessary if all the gradient pulses had the same polarity ([Gras 2017 B]). In principle, when the polarity of the gradient pulses is changed, the radiofrequency pulses need to be temporally returned, but in the case considered herein these are symmetrical.

The gradient pulses IG1, IG2 and IG3, which do not overlap the radiofrequency pulses, determine respective positions in the space k from which the selection gradients "plot" the "spokes". The position in the space k determined by a gradient pulse solely depends on the area $B_{i'}$ of each of its three components. It should be noted that the gradient pulses are much less intense than the selection gradients; in [FIG. 3], for the sake of visibility, they have been amplified by a factor of 100.

A method for determining a global parameterization for a family of spin-excitation pulse sequences according to one embodiment of the invention will be described in detail hereafter. The description is based on the field of approximating small flip angles of the spins, which allows the Bloch equations to be linearized; however, a generalization with large angles is entirely possible.

Let $N_c$ be the number of channels and $N_s$ be the number of radiofrequency pulses used. The information concerning the time of each RF pulse and of each gradient pulse can be shown in the form of a matrix, namely a complex matrix $A \in \mathbb{C}^{N_c 33\, N_s}$ and a matrix $B \in \mathbb{R}^{3 \times (N_s-1)}$, respectively. In this representation, each column indicates the times per transmission channel (per x, y, z axis) of the RF pulse (of the gradient pulse).

In order to fulfil the condition whereby the total time of the magnetic gradient along each axis is zero, the last RF sub-pulse is followed by a gradient pulse, the components of which along x, y, and z are equal to:

$$B_{final} = -B\Sigma_{N_S-1}$$

where $$\Sigma_{N_S-1} = (1, \ldots, 1)^T \in \mathbb{R}^{(N_S-1)\times 1}$$

The fact that this condition is fulfilled is not essential (the flip angle does not depend on this) but it can prove to be necessary depending on the MRI sequence (sequences of the "steady-state free precession" type).

$B_{full} = (B, B_{final}) \in \mathbb{R}^{3\times N_s}$ denotes the vector of the magnetic gradient coefficients supplemented by the final pulse: each element of the vector is equal to the sum of the areas of the gradient pulses along an axis.

$B_1^{30}(r) \in \mathbb{C}^{1\times N_c}$ denotes the values of the magnetic field resonating at r on each transmission channel. These values are normalized to 1 Volt transmitted over each channel; they are therefore expressed as Tesla per Volt (T/V).

The position of the RF pulses in the transmission space K is defined by:

$$K = -B_{full}T$$

and $T \in \mathbb{R}^{N_s \times N_s}$ is the lower triangular matrix:

$$T = \left(\begin{bmatrix} 1 & \cdots & 0 \\ \vdots & \ddots & \vdots \\ 1 & \cdots & 1 \end{bmatrix}\right).$$

In the absence of a slice selection gradient, the flip angle of the nuclear spins $\alpha(r)$ created at r by the succession of the $N_s$ RF pulses is expressed, in the approximation of the small flip angles, as:

$$\alpha(r) = |\gamma B_1^+(r) A(K, r)\Sigma_{N_S}|$$

where $A(K, r)$ is the matrix with the general term:

$$A(K, r)_{i,j} = A_{i,j} e^{i(xK_{1,j} + yK_{2,j} + zK_{3,j})}$$

where $K_{i',j}$, $(1 \leq i' \leq 3)$ denotes the coefficient of the row $i'$ and of the column j in the matrix K; and where $\Sigma_{N_S} = (1, \ldots, 1)^T \in \mathbb{R}^{N_s \times 1}$.

$FA_r$ denotes the operator $(A, B) \mapsto \alpha(r)$, which depends on the distribution of the radiofrequency field in the body to be imaged, i.e., on one or more (in the case of parallel transmission) maps $B_1^+(r)$.

In the presence of a slice selection gradient, at any point on the axis of the slice C, the flip angle is still provided by $FA_r(A, B)$.

In order to be fully defined, a multi-slice protocol with N slices $C^{(1)}, \ldots, C^{(N)}$ requires the definition of N distinct parameterizations $\Pi^{(1)} = (A^{(1)}, B^{(1)}), \ldots, \Pi^{(N)} = (A^{(N)}, B^{(N)})$.

For each slice $C^{(c)}$, each complex coefficient $a_{i,j}^{(c)}$ of the matrix $A^{(c)}$ and each real coefficient $b_{i',j'}^{(c)}$, of the matrix $B^{(c)}$ is expressed as a function of the geometric parameters of the slice $(n_c, \zeta_c)$:

$$a_{i,j}^{(c)} = f_{i,j}(n_c, \zeta_c) \in \mathbb{C}$$

$$b_{i',j'}^{(c)} = g_{i',j'}(n_c, \zeta_c) \in \mathbb{R}$$

where $f_{i,j}$ and $g_{i',j'}$ are continuous functions of n and of $\zeta$, respectively, with complex and real values (with the gradient pulses having a real value).

The complex coefficients $a_{i,j}^{(c)}$ and the real coefficients $b_{i',j'}^{(c)}$ form two sets of parameters, which together determine an excitation sequence.

By noting that $C(n, \zeta) = C(-n, -\zeta)$, the functions $f_{i,j}$ and $g_{i',j'}$ also must fulfil the symmetry condition:

$$f_{i,j}(-n, -\zeta) = f_{i,j}(n, \zeta)$$

$$g_{i',j'}(-n, -\zeta) = g_{i',j'}(n, \zeta)$$

Although other parameterizations are possible, it can be advisable to assume, for $f_{i,j}$ and $g_{i',j'}$, functions that are expressed by truncated series in the following form:

$$f_{i,j}(n, \zeta) = f_{i,j,0}(n) + f_{i,j,1}(n)\bar{\zeta}^1 + \ldots + f_{i,j,p}(n)\bar{\zeta}^p$$

$$g_{i',j'}(n, \zeta) = g_{i',j',0}(n) + g_{i',j',1}(n)\bar{\zeta}^1 + \ldots + g_{i',j',p'}(n)\bar{\zeta}^{p'}$$

where $\zeta_0 > 0$ is a length long enough for the ball that is centered on the isocenter, and with a radius $\zeta_0$, to contain the region of interest, $$\bar{\zeta} = \begin{cases} -1 & \text{if } \zeta < -\zeta_0 \\ \dfrac{\zeta}{\zeta_0} & \text{if } |\zeta| \leq \zeta_0 \\ 1 & \text{if } \zeta > \zeta_0 \end{cases}$$

and $f_{i,j,0}, \ldots, f_{i,j,p}$ and $g_{i',j',0}, \ldots, g_{i',j',p'}$ are continuous functions on the unit sphere fulfilling the following condition:

$$f_{i,j,k}(-n) = (-1)^k f_{i,j,k}(n)$$

and $$g_{i',j',k}(-n) = (-1)^k g_{i',j',k}(n).$$

With the spherical harmonics forming a base of continuous functions on the unit sphere, it is worthwhile selecting, for $f_{i,j,k}$, finite sums (up to the order q) of complex spherical harmonics by retaining, for even k, only harmonics whose degree is even and, for odd k, only harmonics whose degree is odd:

$$f_{i,j,k}(n) = \Sigma_{l=0}^{q}(\Sigma_{m=-l}^{l} f_{i,j,k,l,m} Y_l^m(n))$$

With the constraint:

$f_{i,j,k,l,m} = 0$ for odd $k + l$ and:

$$Y_l^m(n) = \sqrt{\frac{2l+1}{4\pi}\frac{(l-m)!}{(l+m)!}} P_l^m(\cos(\theta))e^{im\phi}$$

where $P_l^m$ is the Legendre polynomial of the order (l, m). With the following constraint, it is easy to verify that the symmetry constraint of the functions $f_{i,j}(\zeta, z)$ is indeed fulfilled for the whole of i and for the whole of j.

For $g_k$, the same rule applies, except that the decomposition occurs on the real spherical harmonics, up to a certain order q', and that the coefficients $g_{i',j',k',l,m}$ are real:

$$g_{i',j',k}(n) = \Sigma_{l'=0}^{q'}(\Sigma_{m'=-l'}^{l'} g_{i',j',k',l',m'} Y_{l',m'}(n))$$

With the constraint:

$g_{i',j',k',l',m'} = 0$ for odd $k' + l'$ and:

$$Y_{l',m'} = \frac{i}{\sqrt{2}}\left(Y_{l'}^{m'} - (-1)^{m'} Y_{l'}^{-m'}\right) \text{ for } m' < 0$$

$$Y_{l',0} = Y_{l'}^0 \text{ for } m' = 0$$

-continued $$Y_{l',m'} = \frac{i}{\sqrt{2}}\left(Y_{l'}^{-m'} + (-1)^{m'} Y_{l'}^{m'}\right) \text{ for } m' < 0.$$

In conclusion, each term of each truncated series expressing $f_{i,j}$ and $g_{i',j'}$ is provided by the product of a monomial of the position coordinate $\zeta$ and of a finite sum of complex or real spherical harmonics (more generally, of functions belonging to a base of continuous functions of the angular orientation coordinates).

Thus, in this approach, any multi-slice protocol is fully characterized as soon as the matrices:

$$F=(f_{i,j,k,l,m})$$

and:

$$G=(g_{i',j',k',l',m'})$$

are defined. Let X be the real vector made up of the coefficients of F followed by those of G. Let $A_{n,\zeta}(X)$ and $B_{n,\zeta}(X)$ denote the matrices A and B acquired by assessing the functions $f_{i,j}$ and $g_{i',j'}$ at $(n,\zeta)$. Let $\Pi_{n,\zeta}(X)=(A_{n,\zeta}(X), B_{n,\zeta}(X))$ denote the complete parameterization thus acquired, which is sufficient for characterizing the action of the sequence of pulses in the axis of the slice C(n, z).

The problem then arises of optimizing the coefficients of these matrices so as to acquire the best possible conformity of the flip angle with a given flip angle setpoint $\alpha_T$, irrespective of the considered slice.

For a given position r=(x, y, z) and for a given unit vector n, let $C_n(r)$ be the normal slice at n passing through r, with its position being provided by:

$$\zeta=n\cdot r$$

$C_n(r)$ is nothing other than C(n, n·r). Given a parameterization X, the flip angle $\alpha_{n,r}(X)$ can be defined that is acquired at r by "acting on" the sequence $\Pi_{n,n\cdot r}(X)$, i.e., by applying this sequence to the body to be imaged.

With the point r being a point in the axis of the slice $C_n(r)$, the following is acquired:

$$\alpha_{n,r}(X)=FA_r(\Pi_{n,n\cdot r}(X))$$

It is then possible to define, at each point, the mean square deviation for the flip angle setpoint when the slice selection axis passes through the unit sphere:

$$\varepsilon_r(X) = \frac{1}{4\pi\alpha_T^2} \int\int_n (\alpha_{n,r}(X) - \alpha_T)^2 d^2n$$

By summation in the region of interest ROI (denoted $\mathcal{R}$ in the equations), the mean square deviation for the setpoint can be defined as follows:

$$\varepsilon(X)=\Sigma_{r\in\mathcal{R}}\varepsilon_r(X)$$

Finally, an optimal parameterization X can be acquired by solving the optimization problem:

$$\min_X \varepsilon(X)$$

Advantageously, constraints are added to this problem in order to acquire permissible solutions. These constraints notably relate to the energy of the RF pulses.

s: $[0,1]\to\mathbb{R}$ denotes the temporal shape of a generic RF pulse and T denotes its duration. Let $M_1(s)=|\int_0^1 s(t)dt|$, and $M_2(s)=\int_0^1 |s(t)|^2 dt$ be the first and second order times of the pulse s(t). For a parameterization selection of $\Pi=(A, B)$, it is possible to define (in this case assuming 50 Ohm impedance matching for the whole of the RF transmission chain):

The energy per channel and per sub-pulse $$E_{i,j}(\Pi) = \frac{1}{T} \frac{|A_{i,j}|^2 M_2(s)}{M_1(s)^2 (50\ \Omega)} \text{ (Joules)}$$

The energy per channel $E_i(\Pi)=\Sigma_{j=1\ldots N_s} E_{i,j}(\Pi)$

The total energy of the composite pulse $E(\Pi)=\Sigma_{i=1\ldots N_c} E_i(\Pi)$ Given a parameterization X, it is possible to define the following for the whole of i and for the whole of j:

$$E_{i,j,n,\zeta}(X)=E_{i,j}(\Pi_{n,\zeta}(X))$$

It should be noted that the fact that $\zeta$ is limited ensures that $\Pi_{n,\zeta}(X)$, and therefore $E_{i,j}(\Pi_{n,z}(X))$, is limited (even though the polynomial functions behind the construction of $\Pi_{n,z}(X)$ are not). This set of functions allows a set of constraints to be defined restricting the space of the solutions to a domain yielding permissible parameterizations in terms of the radiofrequency energy balance. It is thus possible to define:

$$E_{i,j}(X)=\max_{\zeta,n} E_{i,j}(\Pi_{n,\zeta(X)})$$

Adding explicit constraints of the following type:

$$\forall i, j, \sqrt{\frac{E_{i,j}(X)}{E_{sp}}} - 1 \leq 0$$

allows, for example, the energy of each sub-pulse to be limited for the most unfavorable slice orientation and slice position from among all the conceivable ones with an intersection with the region of interest $\mathcal{R}$.

The technical effect of the invention has been demonstrated in a simple case using data (emission radiofrequency field map) acquired on a Siemens Magnetom 7T system equipped with a parallel transmission system with 8 channels of a head antenna array with 8 transmission channels and 32 reception channels by Nova Medical. This proof of concept is limited to a cutting axis in the YZ plane, in other words to $\phi=0$. This results in the dimension of the functions f and g being reduced by 1. Thus, in this demonstration, the functions $f_{i,j}$ appear as functions of $\zeta$ and of $\theta$ and the functions $f_{i,j,k}$ appear as continuous functions on the unit circle. They accept the following decomposition:

$$f_{i,j,k}(\theta)=\Sigma_{l=-q}^{q} f_{i,j,k,l} e^{il\theta}$$

The same reasoning applies to g. With this function being real, then:

$$g_{i',j',k'}(\theta)=\Sigma_{l=0}^{q} g_{i,j,k,l} \cos(l\theta)+\Sigma_{l=1}^{q} g_{i,j,k,-l} \sin(l\theta)$$

With $g_{i,j,k,l}$ and $g_{i,j,k,-l}$ being real for the whole of l. Limited to the case of $N_s=2$ (sequence made up of two pulses) and to $p=p'=q=q'=4$. For $\zeta_0$, 8 cm is used. For the sub-pulse, T=1 ms, $$s(t)=\text{sinc}(3\pi\tilde{t})h(\tilde{t})$$

Where h(•) represents the Hanning apodization function. Then for this selection of sub-pulse;

$$\frac{M_2(s)}{M_1(s)^2} = 2.2894.$$

The demonstration is based on the $B_1^+$ map (5 mm of isotropic resolution) measured with the XFL sequence on the head of a human subject; the problem that is raised involves computing the parameterization X minimizing the mean square deviation to a target flip angle of 30° on the region of interest made up of all the voxels of the brain (metric $\varepsilon$). The following constraint is added to the objective:

$$\forall i \in \{1, \ldots, N_c\}, \forall j \in \{1, 2\}, \sqrt{\frac{E_{i,j}(X)}{E_{sp}}} - 1 \leq 0$$

With:

$$E_{sp} = 33 \text{ mJ}$$

Computing the metric $\varepsilon(X)$, involving integration on a unit circle, this integration is reduced to an integration on a half-circle $0 \leq \theta \leq \pi$ by virtue of the fact that $\alpha_{-n,r}(X) = \alpha_{n,r}(X)$ and is discretized fairly roughly by posing the following as a new cost function to be minimized:

$$\varepsilon_d(X) = 2/N_\theta \Sigma_{k=0}^{N_\theta - 1} \Sigma_{r \in \mathcal{R}} (\alpha_{n_k,r}(X) - \alpha_T)^2$$

Where $$N_\theta = 18, \theta_k = \frac{k\pi}{N_\theta}, n_k = (0, \sin(\theta_k), \cos(\theta_k))$$

(one point every 10°).

For the computation of $E_{i,j}(X, s)$, $\Pi_{n,z}(X, s)$ is assessed for $n \in \{n_1, \ldots, n_{N_\theta}\}$ and for a set of discrete values of $\zeta$ evenly distributed in the range $[-\zeta_0, \zeta_0]$ with a 5 mm step.

For the constrained minimization of $\varepsilon_d(X, s)$, the Matlab (registered trademark) (R2019a Update 7) implementation of the SQP (Sequential Quadratic Programming) algorithm is used.

To initialize the optimization, a two-step approach is adopted, as described below:
i) $N_s = 1$ (a single sub-pulse and, consequently, no "hopping" in the transmission space k since the latter assumes $N_s > 1$);
ii) for the whole of $1 \leq i \leq N_c$, $f_{i,1}(z) = f_0$, where $f_0$ is independent of $\theta$ and of i and is defined by the following equation:

$$f_0 = \frac{\alpha_T}{T\gamma \langle B_1^+(r)\Sigma_0 \rangle} \text{ Where: } \langle B_1^+(r)\Sigma_0 \rangle =_{def.} \frac{1}{|\mathcal{R}|} \Sigma_{r \in \mathcal{R}} B_1^+(r)\Sigma_0$$

Where $\Sigma_0 = (1, \ldots, 1)$ is the standard transmission mode of the antenna.

Starting from this initialization, a first optimization SQP with $N_s = 1$ and $p = p' = 7$ is applied by limiting the number of iterations to 50. This optimization searches for a solution in a 44 dimensional space (X with dimensions of 44).

The acquired solution ($X_1$), following convergence of the algorithm, is used to define a new two-pulse initialization, both in k=0 (g=0) and both with an amplitude of $f_0/2$ on all the channels. It is easy to check that the flip angle profile is not modified by this operation. This second iteration of the SQP algorithm is applied with $p = p' = 7$, and $q = q' = 4$ up to the convergence of the algorithm. This optimization relates to a 396 dimensional problem (X with dimensions of 396).

In order to demonstrate a practical advantage of this parametric approach for defining any optimized selective excitation relative to the homogeneity of the flip angle in the slice, the method has a conventional slice design. Considering the case of the excitation of 52 axial slices ($\theta$=0) that are 1 mm thick and follow a distance of 1.2 mm (center-to-center) between two adjacent slices. For each slice position, the best parameterization $\Pi_{z,n_0}^{ss}$ is computed according to the following criterion:

$$\varepsilon^{ss}(\Pi) = \Sigma_{r \in \mathcal{R}_{2d}} (FA_r(\Pi) - \alpha_T)^2$$

Where:

$$\mathcal{R}_{2d} = \mathcal{R} \cap C(n_0, \zeta)$$

is solved digitally.

As for the previous optimization, the SQP algorithm is used for computing optimal $\Pi_{z,n_0}^{ss}$ (52 independent optimizations). For its initialization, this starts from the parameterization $\Pi_0 = (A_0, 0)$, where $A_0$ is a constant matrix and which fulfils:

$$\frac{1}{|\mathcal{R}_{2d}|} \Sigma_{r \in \mathcal{R}_{2d}} FA_r(\Pi) = \alpha_T$$

Starting from an initial value of 0.26 for the optimization criterion, the SQP algorithm converges to a value of 0.04 in approximately 180 iterations.

Given the solution that is found, namely $X_{opt}$, it is possible to compute, for any pair $(\zeta, \theta)$, the flip angle profile in the slice $C(\zeta, n_\theta = (0, \sin(\theta), \cos(\theta))$ produced by $\Pi_{z, n_\theta}$ ($X_{opt}$). It is then possible to compute the mean square deviation for the setpoint of the flip angle, normalized to the flip angle setpoint (FA-NRMSE). This FA-NRMSE map is shown in [FIG. 4]. Except for very extreme values of $\zeta$, which are insignificant since the intersection between the region of interest (brain) and the slice is very small, the mean square deviation for the setpoint is checked to determine that it does not exceed 5%.

Figure 4:
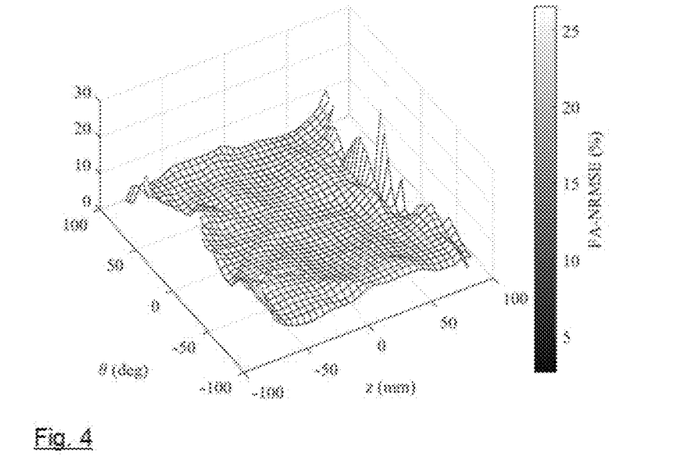
FIG. 4, FIG. 5a, FIG. 5b, FIG. 6, FIG. 7a, FIG. 7b and FIG. 7c graphs illustrating the technical effect of the invention.

Based on the same principle, it is possible to compute, for the whole of $(\zeta, \theta)$, on each channel and each sub-pulse, the energy of the sub-pulses of $\Pi_{z,n_\theta}$ ($X_{opt}$). It has been found that the maximum for the energies of the pulses as a function of $(\zeta, \theta)$ does not exceed 0.16 Joules.

Figure 5A:
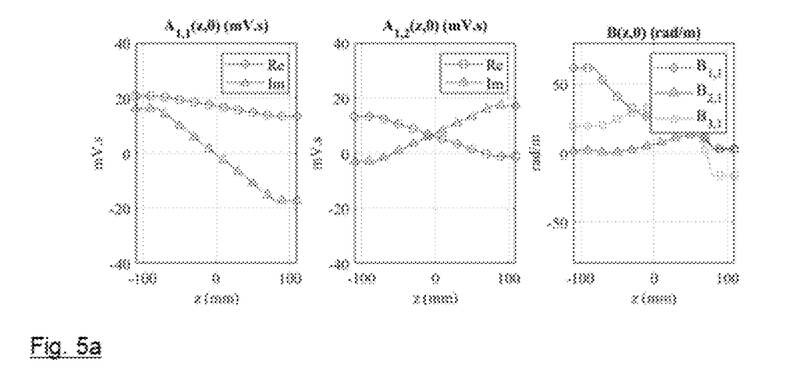
Figure 5B:
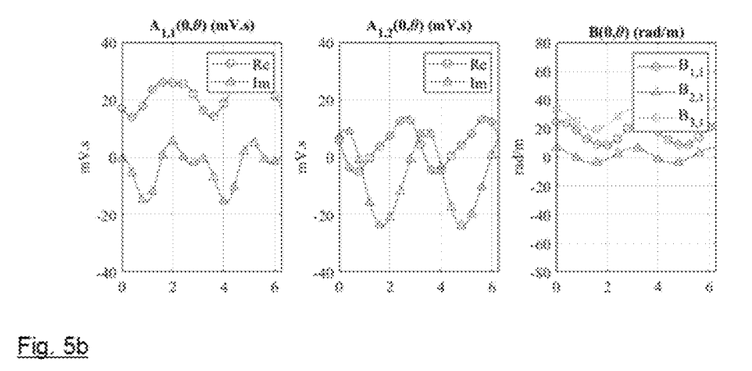

FIG. 5a and FIG. 5b show a partial graphical representation of $\Pi_{z,n_\theta}$ ($X_{opt}$) for $\theta$=0 (FIG. 5a) and for $\zeta$=0 (FIG. 5b). In particular, it is possible to verify the constant nature of $\Pi_{\zeta,n_\theta}$ ($X_{opt}$) when $|\zeta| > \zeta_0$. Moreover, a check is undertaken to determine that for $\zeta$=0, $\Pi_{\zeta,n_\theta}$ ($X_{opt}$) is π-periodic at $\theta$.

Figure 6:
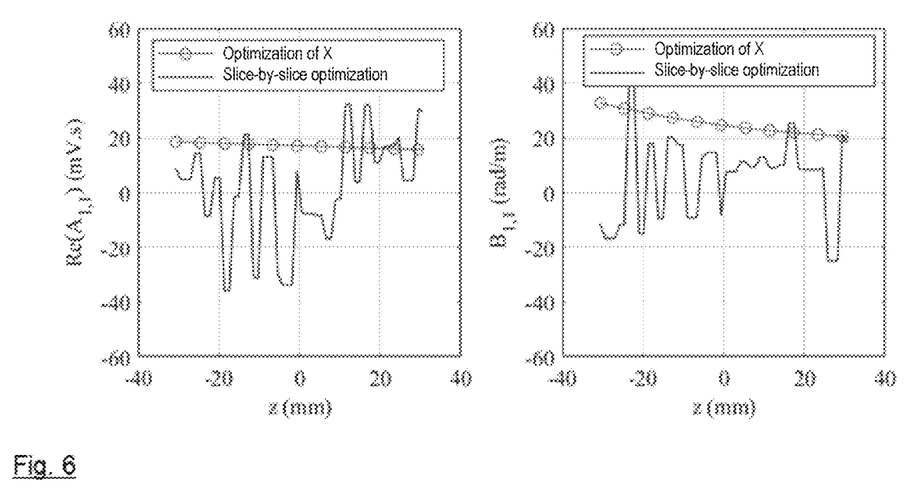

FIG. 6 allows $\Pi_{\zeta,n_\theta}$ ($X_{opt}$) to be compared with $\Pi_{\zeta,n_\theta}^{ss}$, i.e., two sequences defining multi-slice protocols (52 slices) acquired according to the invention (global parameterization) and to the prior art (slice-by-slice optimization), respectively. The left-hand panel represents the coefficients $A_{11}$ (real part) of the matrix A and the left-hand panel represents the coefficients $B_{11}$ of the matrix B. A check is undertaken to determine that the parametric approach definitely yields a continuous and regular evolution of the matrices A and B when passing through the slices, and that this is not the case with the non-parametric approach, where $\Pi_{\zeta,\theta}^{ss}$ is optimized without taking into account the neighboring slices.

Figure 7A:
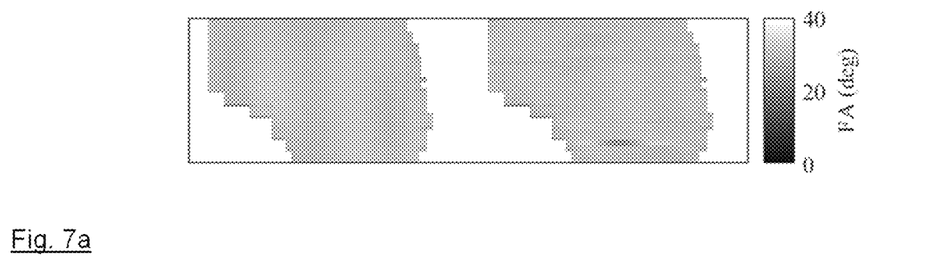
Figure 7B:
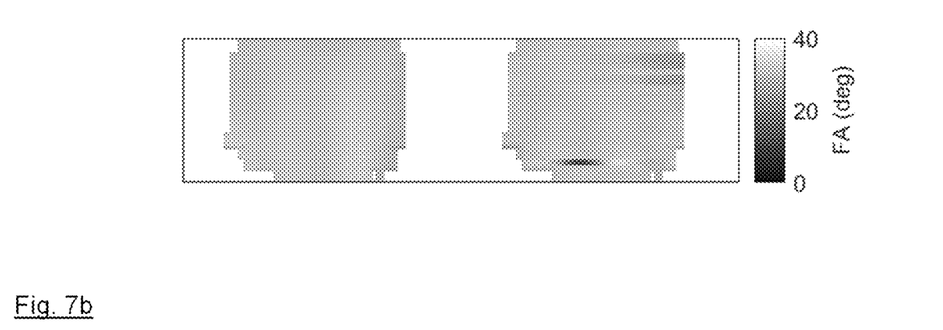
Figure 7C:
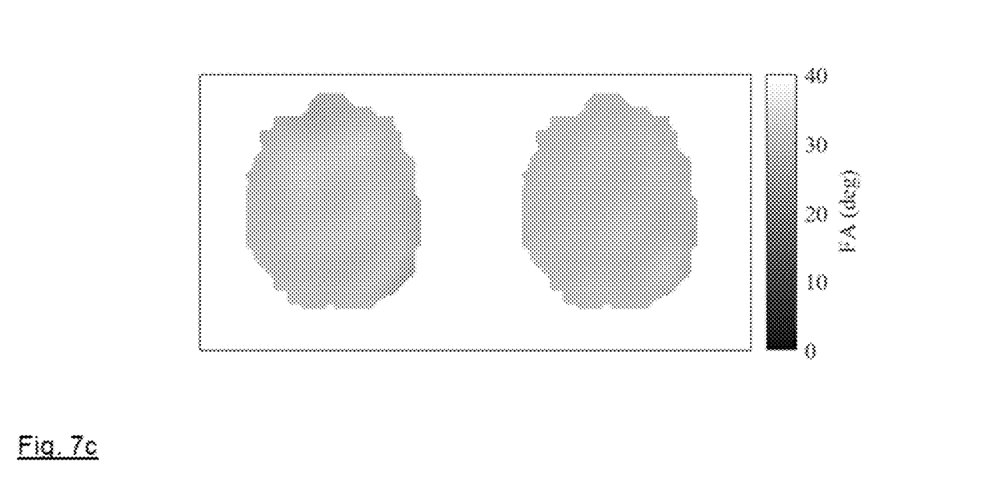

FIG. 7a, FIG. 7b and FIG. 7c are maps of the distribution of the flip angle in a sagittal plane x=0 (FIG. 7a), a coronal plane y=0 (FIG. 7b) and an axial plane z=0 (FIG. 7c) acquired according to the invention (left-hand images) and using the non-parametric approach defined by $\Pi_{\zeta,n_\theta}^{ss}$ (right-hand images). These figures show the effect of the discontinuous character of $\Pi_{\zeta,n_\theta}^{ss}$ on the flip angle profile. The flip angle indeed has an even profile in the cutting planes but nevertheless exhibits discontinuities when it is observed in an orthogonal plane, for example, sagittal or coronal. This problem is solved with the global parameterization according to the invention.

Figure 8:
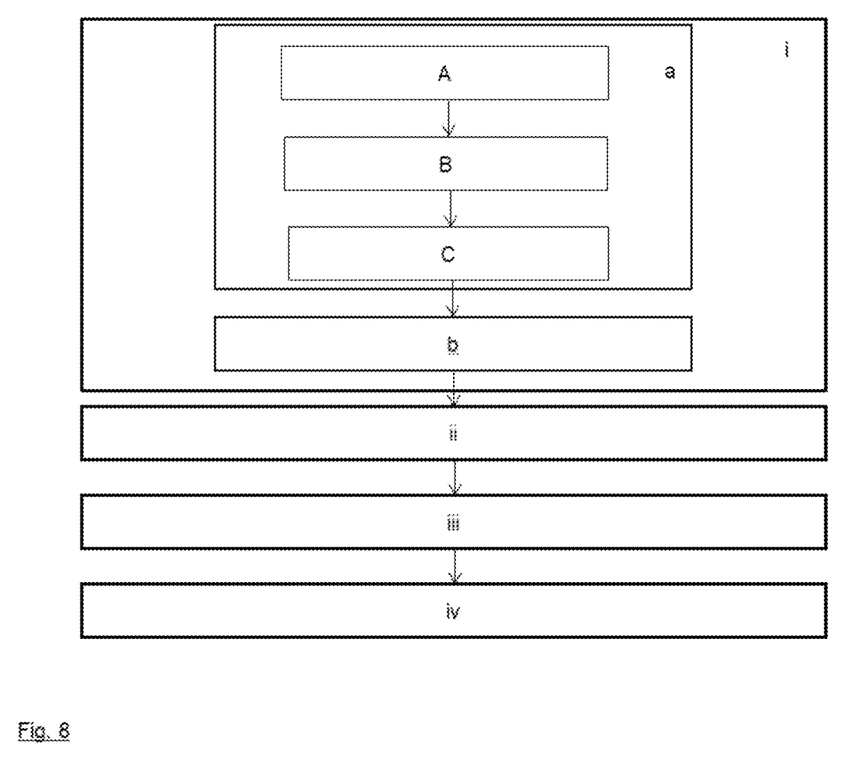
FIG. 8 a flowchart of a method according to one embodiment of the invention.

FIG. 8 is a flowchart of a magnetic resonance imaging method implementing various aspects of the invention.

A first step i of the method involves designing a plurality of multi-spoke spin-excitation pulse sequences, with each of said pulse sequences corresponding to a respective slice. According to the invention, this first step is divided into two sub-steps: a first sub-step a) involving determining a global parameterization or "meta-pulse" using the method described above; and a second step b) involving acquiring the sequences of excitations corresponding to each slice on the basis of this global parameterization and the position ($\zeta$) and orientation ($\theta,\phi$) coordinates of the slice.

The sub-step a) comprises three phases:

A): acquiring a map of $B_1^+$ for each emission channel;
B): defining a first set of parameters $\alpha_{i,j}^{(c)}$ characterizing the radiofrequency pulses and a second set of parameters $b_{i,j}^{(c)}$ characterizing the magnetic gradient pulses. As explained above, the value of each parameter of each of said sets is expressed by a truncated series of functions of a position coordinate and of a pair of angular orientation coordinates of one of said slices, with each series being determined by its coefficients $f_{i,j,k,l,m}$, $g_{i',j',k',l',m'}$;
C) computing the values of the coefficients $f_{i,j,k,l,m}$, $g_{i',j',k',l',m'}$ so as to minimize the mean square deviation (or another suitable cost function) for a setpoint of the excitation of the nuclear spins, with the mean being computed for said volume of interest and for all the possible orientations and positions of said slices.

The second step ii) involves applying the spin-excitation pulse sequences thus computed to the body in succession, with the corresponding selection gradients.

The third step iii) involves acquiring the magnetic resonance signals after each excitation sequence.

Furthermore, the fourth step iv) involves processing the signals thus acquired in order to reconstruct an image of a portion of said reference volume defined by the union of the slices.

Steps ii)-iv) are conventional per se, with the technical contribution of the invention mainly residing in determining the global parameterization and applying it to the design of the excitation sequences that are actually used.

The invention has been described with reference to a particular embodiment, but alternative embodiments are possible. For example:

A single emission channel can be used, instead of a plurality of channels carrying out a parallel transmission.

2d multi-band excitation can be carried out (simultaneous addressing of several parallel slices) [Möller 2010]. In this case, it is necessary to impose, for the whole of i', j', $g_{i',j'}(n,\zeta)$ the shape $g_{i',j',0}(n)$ (i.e., independent of $\zeta$). This condition actually ensures that all the pulses of the simultaneously applied sequences (one sequence per slice) have the same positions in the transmission space K.

The demonstration of the principle was carried out in the case of optimization of the excitation specific to a measured $B_1^+$ map. However, the method is generalized to the case of simultaneous design, resulting in "universal" solutions. To this end, according to the approach described in EP 15306569 and EP 3594710, $B_1^+$ maps need to be acquired for a plurality of bodies (MRI subjects) with different electromagnetic properties and the global parameterization for all subjects needs to be jointly optimized. This allows a "universal" global parameterization to be acquired that is suitable for a category of bodies to be imaged or that can be "customized" as a function of easily measurable properties of a determined body. In this way, there is no need to acquire $B_1^+$ maps for each body to be imaged.

The demonstration of the principle was carried out in the case where approximating small flip angles is valid, but generalizing to large flip angles does not pose a fundamental problem.

The shape of the selected parameterization (polynomial by $\zeta$ and spherical harmonics by $\theta$, $\phi$) is particularly suited to the problem, but is not the only one that is eligible. Truncation by $\zeta$ is a useful procedure for overcoming the fact that the polynomial functions infinitely diverge. In this case again, other approaches potentially can be contemplated.

Optimizing the mean square deviation of the excitation for the target is a common and advantageous criterion on the mathematical plane, but other functions of the deviation for the target can be used. Moreover, although this is the most common case, it is not essential for the target excitation to be constant over the entire slice.

The invention does not presuppose a particular type of pulses. The embodiment described in detail is the simplest, involving a constant magnetic gradient combined with a radiofrequency waveform of the apodized cardinal sine type. Nevertheless, the invention can be implemented with other pulses, for example, of the SLR [Shinnar 1994, Sharma 2015] and/or VERSE [Conolly 1988] type.

REFERENCES

[Conolly 1988] S. Conolly, D. Nishimura, A. Macovski, and G. Glover, "Variable-rate selective excitation", Journal of Magnetic Resonance (1969), Vol. 78, No. 3, pp. 440-458, 1988.

[Shinnar 1994] M. Shinnar, "Reduced power selective excitation radiofrequency pulses", Magnetic resonance in medicine, Vol. 32, No. 5, Art. No. 5, 1994.

[Setsompop 2008] Setsompop, Kawin, Vijayanand Alagappan, Borjan Gagoski, Thomas Witzel, Jonathan Polimeni, Andreas Potthast, Franz Hebrank, et al. "Slice-selective RF pulses for in vivo B1+ inhomogeneity mitigation at 7 Tesla using parallel RF excitation with a 16-element coil". Magnetic Resonance in Medicine 60, No. 6 (2008): 1422-1432.

[Möller 2010] S. Moeller et al., "Multiband multislice GE-EPI at 7 Tesla, with 16-fold acceleration using partial parallel imaging with application to high spatial and temporal whole-brain fMRI", Magn. Reson. Med., Vol. 63, No. 5, Art. No. 5, May 2010.

[Amadon 2012] [1] A. Amadon, M. A. Cloos, N. Boulant, M.-F. Hang, C. J. Wiggins, and H.-P. Fautz, "Validation of a very fast B1-mapping sequence for parallel transmission on a human brain at 7T", In Proceedings of the 20th Annual Meeting of ISMRM, pp. 3358, 2012.

[Poser 2014] Poser, Benedikt A., Robert James Anderson, Bastien Guerin, Kawin Setsompop, Weiran Deng, Azma Mareyam, Peter Serano, Lawrence L. Wald, and V. Andrew Stenger. "Simultaneous multislice excitation by parallel transmission". Magnetic Resonance in Medicine 71, No. 4 (2014): 1416-1427.

[Guérin 2015] Guérin, Bastien, Kawin Setsompop, Huihui Ye, Benedikt A. Poser, Andrew V. Stenger, and Lawrence L. Wald. "Design of parallel transmission pulses for simultaneous multislice with explicit control for peak power and local specific absorption rate". Magnetic Resonance in Medicine 73, No. 5 (2015): 1946-1953.

[Sharma 2015] A. Sharma, R. Bammer, V. A. Stenger, and W. A. Grissom, "Low peak power multiband spokes pulses for $B_1^+$ inhomogeneity-compensated simultaneous multislice excitation in high field MRI: Low Peak Power Multiband Spokes Pulses", Magnetic Resonance in Medicine, Vol. 74, No. 3, Art. No. 3, September 2015.

[Gras 2017] Gras, Vincent, Alexandre Vignaud, Alexis Amadon, Franck Mauconduit, Denis Le Bihan, and Nicolas Boulant. "In Vivo Demonstration of Whole-Brain Multislice Multispoke Parallel Transmit Radiofrequency Pulse Design in the Small and Large Flip Angle Regimes at 7 Tesla". Magnetic Resonance in Medicine 78, No. 3 (2017): 1009-19.

[Gras 2017 B] V. Gras, A. Vignaud, A. Amadon, F. Mauconduit, D. Le Bihan, and N. Boulant, "New method to characterize and correct with sub-µs precision gradient delays in bipolar multispoke RF pulses", Magn. Reson. Med, Vol. 78, pp. 2194-2202, January 2017.

[Cao 2015] Z. Cao et al., "Joint design of large-tip-angle parallel RF pulses and blipped gradient trajectories", Magnetic Resonance in Medicine, Vol. 75, No. 3, 27 Apr. 2015.

The invention claimed is:

1. A method for implementing a control computer configured and/or operable for implementation with a magnetic resonance imaging appliance for determining a global parameterization for a family of spin-excitation pulse sequences in magnetic resonance imaging, with each pulse sequence of said family being a multi-spoke type sequence suitable for selectively exciting nuclear spins in a respective slice (CP) of a volume of interest (ROI) of a body (C) immersed in a static magnetic field ($B_0$) and comprising a same predetermined number of radiofrequency pulses (IRF1, IRF2, IRF3) at a Larmor frequency of said nuclear spins alternated with magnetic gradient pulses (IG1, IG2, IG3), the method comprising the steps of:
  A) acquiring with at least one radiofrequency emission and reception antenna at least one intensity map of radiofrequency radiation at the Larmor frequency in said volume of interest;
  B) defining with a control computer a first set of parameters characterizing the radiofrequency pulses and a second set of parameters characterizing the magnetic gradient pulses, with a value of each parameter of each of said sets being expressed by a truncated series of functions of a position coordinate (ζ) and of a pair of angular orientation coordinates (φ, θ) of one of said slices, with each series being determined by its coefficients;
  C) computing with the control computer, from said one or more intensity maps, the values of the coefficients of said truncated series of functions that minimize a function representing a mean deviation from a predetermined setpoint of the excitation of the nuclear spins, with said mean deviation being computed for said volume of interest and for all possible orientations and positions of said slices; and with said values forming said global parameterization.

2. A method for implementing a control computer configured and/or operable for designing a multi-spoke spin-excitation pulse sequence in magnetic resonance imaging for implementation with a magnetic resonance imaging appliance, with said pulse sequence being suitable for selectively exciting nuclear spins in a respective slice (CP) of a volume of interest (ROI) of a body (C) immersed in a static magnetic field ($B_0$) and comprising a same predetermined number of radiofrequency pulses (IRF1, IRF2, IRF3) at a Larmor frequency of said nuclear spins alternated with magnetic gradient pulses (IG1, IG2, IG3), with the slice being identified by values of a position coordinate (ζ) and of a pair of angular orientation coordinates (φ, θ), the method comprising the steps of:
  a) providing with a control computer a global parameterization for a family of such excitation sequences, with said global parameterization being made up of a first and a second plurality of sets of coefficients of respective truncated series of functions of said position and orientation coordinates of one of said slices, with each set of the first plurality of sets being made up of the coefficients of a truncated series of functions defining a parameter of a radiofrequency pulse and each set of the second plurality of sets being made up of the coefficients of a truncated series of functions defining a parameter of a magnetic gradient pulse; and
  b) computing with the control computer the values of said gradient pulse and radiofrequency pulse parameters from said global parameterization, said truncated series of functions and the values of said position coordinate of said pair of angular orientation coordinates of the slice, wherein said gradient pulse and radiofrequency pulse parameters are configured and/or operable to control gradient coils and control at least one radiofrequency emission and reception antenna.

3. A control computer (OC) configured and/or operable for implementation with a magnetic resonance imaging appliance and the control computer programmed for:
  receiving with the control computer as input at least one intensity map of radiofrequency radiation in a volume of interest (ROI) of a body (C) immersed in a static magnetic field ($B_0$) generated by at least one magnet, with said radiofrequency radiation being at a Larmor frequency of nuclear spins of said body;
  defining with the control computer a global parameterization for a family of multi-spoke spin-excitation pulse sequences in magnetic resonance imaging, with each pulse sequence of said family being suitable for selectively exciting nuclear spins in a slice of said volume of interest and comprising radiofrequency pulses (IRF1, IRF2, IRF3) at a Larmor frequency of said nuclear spins alternated with magnetic gradient pulses (IG1, IG2, IG3), with said global parameterization comprising a first set of parameters characterizing said radiofrequency pulses and a second set of parameters characterizing said magnetic gradient pulses, with a value of each parameter of each of said sets being expressed by a truncated series of functions of a position coordinate (ζ) and of a pair of angular orientation coordinates (φ, θ) of one of said slices with each series being determined by its coefficients, and said radiofrequency pulses and said magnetic gradient pulses are configured and/or operable to control gradient coils and control at least one radiofrequency emission and reception antenna; and computing with the control computer, from said one or more intensity maps, the values of the coefficients of said truncated series of functions that minimize a function representing a mean deviation from a setpoint of the excitation of the nuclear spins, with the mean being computed for said volume of interest and for all possible orientations and positions of said slices.

4. The method as claimed in claim 1, wherein each term of each of said truncated series is provided by a product of a monomial of said position coordinate and of a finite sum of functions belonging to a base of continuous functions of said angular orientation coordinates; and wherein the control computer is configured and/or operable to control gradient coils to generate gradient pulses.

5. The method as claimed in claim 1, wherein step C) comprises minimizing a mean square deviation of the excitation of the nuclear spins from a setpoint, with the mean being computed for said volume of interest and for all the possible orientations of said slices.

6. The method as claimed in claim 1, wherein step C) comprises constrained minimizing of said function representing a mean deviation of the excitation of the nuclear spins from a setpoint.

7. The method as claimed in claim 1, wherein step A) comprises acquiring a plurality of intensity maps of the radiofrequency radiation associated with respective emission channels for radiofrequency radiation, with each radiofrequency pulse of the sequence being made up of sub-pulses intended to be emitted by respective emission channels.

8. The method as claimed in claim 1, wherein step A) comprises acquiring a plurality of intensity maps of the radiofrequency radiation associated with respective bodies having different electromagnetic properties, with the mean deviation from a setpoint of the excitation of the nuclear spins also being computed over the whole of said bodies.

9. A method for designing a multi-spoke spin-excitation pulse sequence in magnetic resonance imaging, with said pulse sequence being suitable for selectively exciting nuclear spins in a respective slice (CP) of a volume of interest (ROI) of a body (C) immersed in a static magnetic field ($B_0$) and comprising a same predetermined number of radiofrequency pulses (IRF1, IRF2, IRF3) at a Larmor frequency of said nuclear spins alternated with magnetic gradient pulses (IG1, IG2, IG3), with the slice being identified by values of a position coordinate ($\zeta$) and of a pair of angular orientation coordinates ($\phi$, $\theta$), the method comprising the steps of:
  a) providing a global parameterization for a family of such excitation sequences, with said global parameterization being made up of a first and a second plurality of sets of coefficients of respective truncated series of functions of said position and orientation coordinates of one of said slices, with each set of the first plurality of sets being made up of the coefficients of a truncated series of functions defining a parameter of a radiofrequency pulse and each set of the second plurality of sets being made up of the coefficients of a truncated series of functions defining a parameter of a magnetic gradient pulse; and
  b) computing the values of said gradient pulse and radiofrequency pulse parameters from said global parameterization, said truncated series of functions and the values of said position coordinate of said pair of angular orientation coordinates of the slice,
  wherein the global parameterization is acquired using a method as claimed in claim 1.

10. A magnetic resonance imaging method comprising the following steps of:
  i) designing a plurality of sequences of multi-spoke spin-excitation pulses, with each of said pulse sequences being suitable for selectively exciting nuclear spins in a respective slice (CP) of a volume of interest (ROI) of a body (C) to be imaged that is immersed in a static magnetic field ($B_0$) and comprising radiofrequency pulses (IRF1, IRF2, IRF3) at a Larmor frequency of said nuclear spins alternated with magnetic gradient pulses (IG1, IG2, IG3), with each slice being identified by respective values of a position coordinate ($\zeta$) and of a pair of angular orientation coordinates ($\phi$, $\theta$);
  ii) applying said spin-excitation pulse sequences to said body in succession, with a magnetic gradient for slice selection being applied at the same time as each radiofrequency pulse;
  iii) acquiring, after each of said spin-excitation pulse sequences, a magnetic resonance signal emitted by the nuclear spins; and
  iv) processing the signals thus acquired in order to reconstruct an image of a portion of a reference volume defined through a union of said slices; and
  characterized in that step i) is implemented as claimed in claim 2.

11. The computer as claimed in claim 3, further programmed for:
  receiving as input a plurality of values of said position coordinate and of respective pairs of said angular coordinates defining a plurality of slices;
  designing, for each of said slices, a spin-excitation pulse sequence by computing values of said radiofrequency pulse parameters and magnetic gradient pulses from the global parameterization computed in step γ, said truncated series of functions and values of said position coordinate and of said pair of angular orientation coordinates of the slice;
  applying said spin-excitation pulse sequences to said body in succession, with a magnetic gradient for slice selection being applied at the same time as each radiofrequency pulse;
  acquiring, after each pulse, a magnetic resonance signal emitted by the nuclear spins; and
  processing the signals thus acquired in order to reconstruct an image of a portion of said volume defined through a union of said slices.

12. A control computer (OC) programmed for implementing the method as claimed in claim 2.

13. The method as claimed in claim 1, further comprising applying said spin-excitation pulse sequences to said body in succession, with a magnetic gradient for slice selection being applied at the same time as each radiofrequency pulse.

14. The method as claimed in claim 1, wherein the magnetic resonance imaging appliance is configured and/or operable to process magnetic resonance imaging signals in order to reconstruct a magnetic resonance imaging image.

15. The method as claimed in claim 2, wherein the magnetic resonance imaging appliance is configured and/or operable to process magnetic resonance imaging signals in order to reconstruct a magnetic resonance imaging image.

16. The computer as claimed in claim 3, wherein the magnetic resonance imaging appliance is configured and/or operable to process magnetic resonance imaging signals in order to reconstruct a magnetic resonance imaging image.

17. The method as claimed in claim 2, wherein each term of each of said truncated series expressing each parameter of the first set is provided by a product of a monomial of said position coordinate and of a finite sum of even symmetry complex spherical harmonics and each term of each of said truncated sums expressing each parameter of the second set is provided by a product of a monomial of said position coordinate and of a finite sum of actual even symmetry spherical harmonics.

18. The method as claimed in claim 6, wherein minimizing is carried out under one or more energy constraints of said radiofrequency pulses.

19. A magnetic resonance imaging (SI) appliance comprising the computer as claimed in claim 11 and the magnetic resonance imaging appliance further comprising:
   the gradient coils; and
   the at least one radiofrequency emission and reception antenna.

* * * * *